United States Patent
Wu et al.

(10) Patent No.: US 12,132,997 B2
(45) Date of Patent: Oct. 29, 2024

(54) ELECTRONIC DEVICE WITH FLASH FUNCTION AND DRIVING METHOD OF FLASH

(71) Applicant: ASUSTeK COMPUTER INC., Taipei (TW)

(72) Inventors: Jo-Fan Wu, Taipei (TW); Hui-Chi Chuang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 196 days.

(21) Appl. No.: 17/974,559

(22) Filed: Oct. 27, 2022

(65) Prior Publication Data

US 2023/0319421 A1    Oct. 5, 2023

(30) Foreign Application Priority Data

Mar. 30, 2022    (TW) .................................. 111112191

(51) Int. Cl.
| | |
|---|---|
| *H04N 23/72* | (2023.01) |
| *H04N 23/55* | (2023.01) |
| *H04N 23/56* | (2023.01) |
| *H04N 23/74* | (2023.01) |
| *H04N 23/84* | (2023.01) |
| *H04N 23/88* | (2023.01) |

(52) U.S. Cl.
CPC ............. *H04N 23/72* (2023.01); *H04N 23/55* (2023.01); *H04N 23/56* (2023.01)

(58) Field of Classification Search
CPC ........ H04N 23/55; H04N 23/56; H04N 23/72; H04N 23/74; H04N 1/6086; H04N 23/70; H04N 23/71; H04N 23/84; H04N 1/6077; H04N 9/3182; H04N 9/73; H04N 13/13; H04N 23/88

See application file for complete search history.

(56) References Cited

U.S. PATENT DOCUMENTS

| | | | |
|---|---|---|---|
| 6,963,362 B1 * | 11/2005 | Nakayama | H04N 23/74 |
| | | | 348/224.1 |
| 7,683,967 B2 * | 3/2010 | Kawakami | H04N 23/74 |
| | | | 348/371 |

(Continued)

FOREIGN PATENT DOCUMENTS

| | | |
|---|---|---|
| CN | 104181752 | 12/2014 |
| CN | 108267909 | 6/2021 |

*Primary Examiner* — Marly S Camargo
(74) *Attorney, Agent, or Firm* — JCIPRNET

(57) ABSTRACT

An electronic device with a flash function and a driving method of a flash are provided. The electronic device includes a flash, an image sensor, and a processor. The flash has a red light source, a green light source, and a blue light source. The image sensor is configured to obtain a preview image of a current scene and outputting the raw data of the preview image. The processor obtains a red ratio value and a blue ratio value according to the current scene, and the processor determines the green brightness value, red brightness value and blue brightness value according to the red ratio value, the blue ratio value and an exposure sensitivity for obtaining the preview image. The processor drives the flash according to the calculated red brightness value, the calculated green brightness value, and the calculated blue brightness value.

20 Claims, 7 Drawing Sheets

(56) References Cited

U.S. PATENT DOCUMENTS

| | | | |
|---|---|---|---|
| 2009/0040335 A1* | 2/2009 | Ito | H04N 23/88 |
| | | | 348/223.1 |
| 2012/0113295 A1* | 5/2012 | Kitagawa | H04N 23/74 |
| | | | 348/224.1 |
| 2014/0071338 A1* | 3/2014 | Gao | G03B 7/16 |
| | | | 348/371 |
| 2014/0176759 A1* | 6/2014 | Goto | H04N 23/88 |
| | | | 348/224.1 |
| 2017/0094241 A1* | 3/2017 | Fujiwara | H04N 23/88 |

* cited by examiner

ELECTRONIC DEVICE WITH FLASH FUNCTION AND DRIVING METHOD OF FLASH

CROSS-REFERENCE TO RELATED APPLICATION

This application claims the priority benefit of Taiwan application serial no. 111112191, filed on Mar. 30, 2022. The entirety of the above-mentioned patent application is hereby incorporated by reference herein and made a part of this specification.

BACKGROUND

Technical Field

The disclosure relates to an electronic device with a flash function and a driving method of a flash.

Description of Related Art

For an existing electronic device with a photographing function, when the light source is insufficient or when being in some special environment, a flash is usually required to compensate for the illumination. However, since a general flash may only provide light with a single brightness and a single color, the emitted light may be very different from the environment, resulting in non-natural imaging results.

SUMMARY

According to the first aspect of this disclosure, an electronic device with a flash function is provided. The electronic device includes a flash, an image sensor, and a processor. The flash has a red light source, a green light source, and a blue light source. The image sensor is configured to obtain a preview image of a current scene and outputting raw data of the preview image. The processor is coupled to the flash and the image sensor. The processor obtains a red ratio value and a blue ratio value according to the current scene. The processor obtains exposure sensitivity according to green brightness information of the preview image. The processor calculates the required green brightness value, red brightness value and blue brightness value according to the exposure sensitivity, the red ratio value, and the blue ratio value. The processor drives the flash according to the red brightness value, the green brightness value, and the blue brightness value.

According to the second aspect of this disclosure, a driving method of flash is provided. The driving method of flash includes the following operation. A preview image of a current scene is obtained through an image sensor, and raw data of the preview image is output. A red ratio value and a blue ratio value are obtained according to the current scene. Exposure sensitivity is determined according to green brightness information of the preview image. A green brightness value is determined according to the exposure sensitivity. The required red brightness value and blue brightness value are calculated according to the green brightness value, a red ratio value, and a blue ratio value. The flash is driven according to the red brightness value, the green brightness value, and the blue brightness value.

Based on the above, the electronic device with a flash function and the driving method of a flash of the disclosure may analyze the raw data of the preview image to obtain the red brightness value, the green brightness value, and the blue brightness value for driving the flash. Therefore, at the moment when the image sensor takes a photo, the flash may simultaneously emit an appropriate illuminating effect corresponding to the light source of the current scene, so that the photographing result of the image sensor may have a good imaging effect.

In order to make the above-mentioned features and advantages of the disclosure comprehensible, embodiments accompanied with drawings are described in detail below.

DETAILED DESCRIPTION OF DISCLOSED EMBODIMENTS

Figure 1:
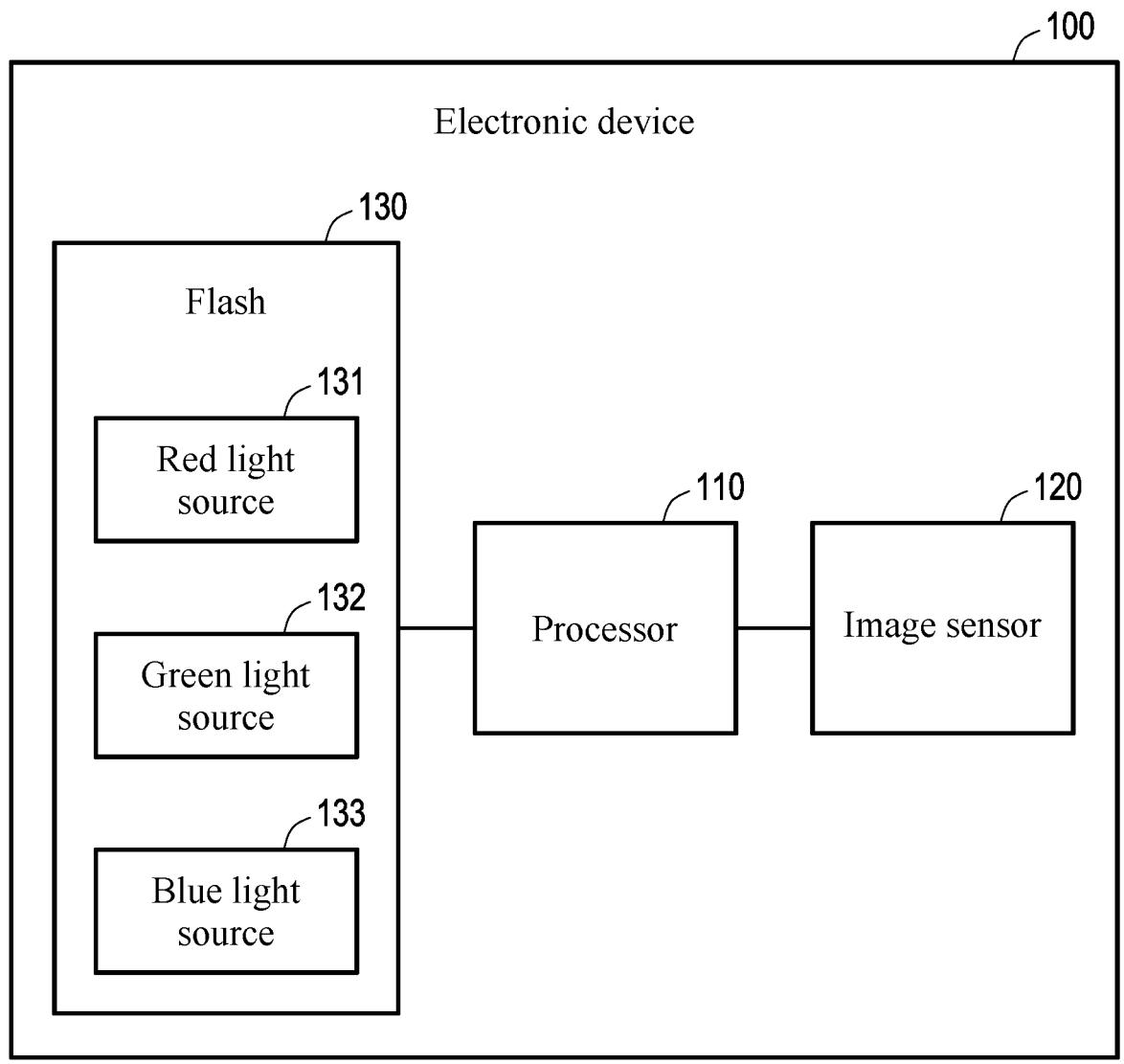
FIG. 1 is a schematic diagram of an electronic device of an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

FIG. 1 is a schematic diagram of an electronic device of an embodiment of the disclosure. Referring to FIG. 1, an electronic device 100 includes a processor 110, an image sensor 120, and a flash 130. The flash 130 includes a red light source 131, a green light source 132, and a blue light source 133. The processor 110 is coupled to the image sensor 120 and the flash 130. In this embodiment, the processor 110 may be a graphics processing unit (GPU), an image processing unit (IPU), an image signal processor (ISP), a central processing unit (CPU), or other processing units with computing functions. The image sensor 120 may be a charge coupled device (CCD) or a complementary metal-oxide semiconductor (CMOS). The red light source 131, the green light source 132, and the blue light source 133 may be light-emitting diodes (LED) or other types of flashes.

In this embodiment, the processor 110 may obtain the preview image through the image sensor 120 (the electronic device 100 executes the photo preview mode), perform related image processing analysis on the raw data of the preview image, and consider the exposure intensity (which may include exposure time and exposure gain) output by the image signal processor (which may refer to the platform ISP or the processor 110) to generate the red brightness value, the green brightness value and the blue brightness value. The processor 110 may drive the flash 130 according to the red brightness value, the green brightness value, and the blue brightness value. When the user presses the shutter, the red light source 131, the green light source 132, and the blue light source 133 of the flash 130 may simultaneously emit light of different colors according to the corresponding ambient color and the corresponding exposure intensity to synthesize an appropriate flash.

Figure 2A:
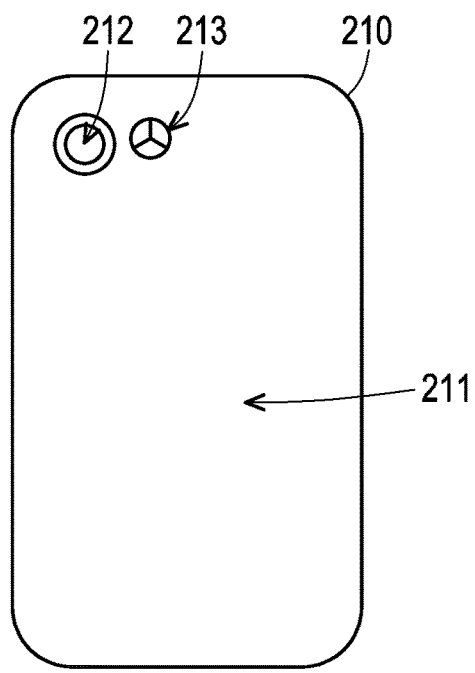
FIG. 2A is a back schematic view of an electronic device of an embodiment of the disclosure.

FIG. 2A is a back schematic view of an electronic device of an embodiment of the disclosure. Referring to FIG. 2A, taking the electronic device 210 as a smartphone as an example, the electronic device 210 includes a back panel 211, in which an image sensor 212 may be disposed at a position of the back panel 211, and a flash 213 may be disposed at a position adjacent to the image sensor 212. In some embodiments of the disclosure, the flash 213 is disposed on the same side as the rear lens of the smartphone. When the user operates the electronic device 210 and takes a photo through the image sensor 212, the flash 213 may provide an appropriate flash effect to illuminate the sensing target.

Figure 2B:
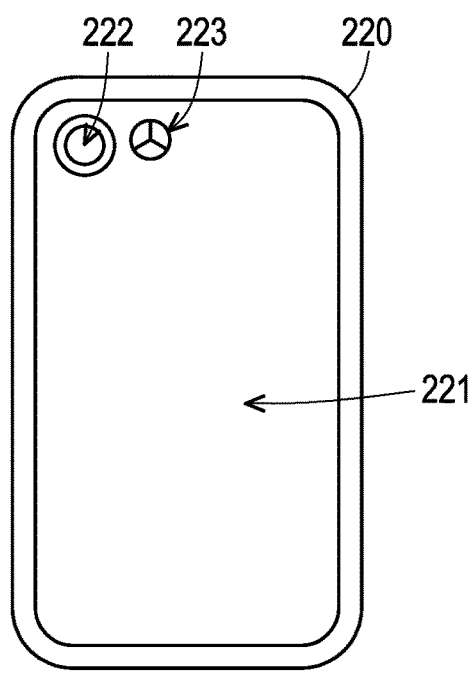
FIG. 2B is a front schematic view of an electronic device of an embodiment of the disclosure.

FIG. 2B is a front schematic view of an electronic device according to an embodiment of the disclosure. Referring to FIG. 2B, the electronic device 220 includes a display panel 221, in which an image sensor 222 may be disposed at a position of the display panel 221, and a flash 223 may be disposed at a position adjacent to the image sensor 222. In other embodiments of the disclosure, the flash 223 is disposed on the same side as the front lens of the smartphone. When the user operates the electronic device 220 and takes a photo through the image sensor 222, the flash 223 or the display panel 221 that may also realize the multi-color (red, green, blue) flash function proposed in this case may provide an appropriate flash effect to illuminate the sensing target.

It is worth noting that, in other embodiments of the disclosure, two flashes with light sources of different colors may be respectively disposed on the back panel and the display panel of the smartphone, in which the number of the flashes is not limited to one, and the disposition position of the flashes is not limited to one. The flash of the disclosure may even be separated from the device body of the electronic device and connected in a wired or wireless manner.

Figure 3:
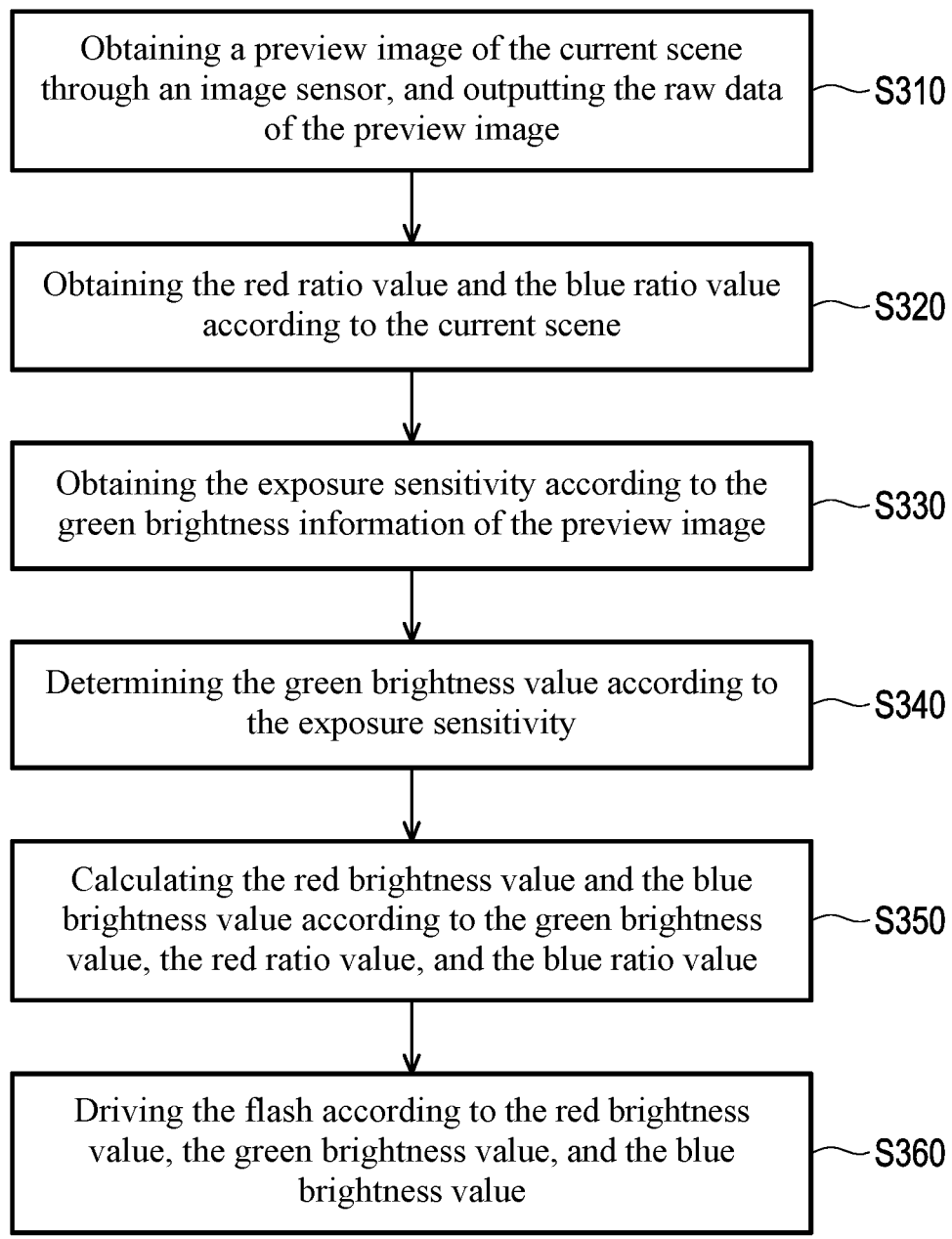
FIG. 3 is a flowchart of a driving method of a flash of an embodiment of the disclosure.

FIG. 3 is a flowchart of a driving method of a flash of an embodiment of the disclosure. Referring to FIG. 1 and FIG. 3, the electronic device 100 of this embodiment may execute the following step S310 to step S360 of FIG. 3 to drive the flash 130. In this embodiment, the user may operate the electronic device 100 and turn on the photographing function. At this time, the image sensor 120 may be activated for continuous sensing, so that the electronic device 100 may, for example, display the preview image through the display panel.

In step S310, the image sensor 120 may obtain a preview image of the current scene, and output the raw data of the preview image. In this embodiment, when the electronic device 100 enters the photo preview mode, the processor 110 may, for example, automatically use the raw data of a certain frame of the preview image for analysis. In step S320, the processor 110 may obtain the red ratio value and the blue ratio value according to the current scene. In this embodiment, the processor 110 may, for example, analyze the raw data of the preview image to determine the light source type of the current scene, so as to obtain the corresponding red ratio value and blue ratio value.

In step S330, the processor 110 may determine the exposure sensitivity according to the green brightness information of the preview image. In this regard, the processor may collect ambient brightness according to the statistical value of the preview image. The green brightness information is used to reflect the ambient brightness. In step S340, the processor 110 may determine the green brightness value according to the exposure sensitivity. In step S350, the processor 110 may calculate the (required) red brightness value and the blue brightness value according to the green brightness value, the red ratio value, and the blue ratio value. In step S360, the processor 110 may drive the flash according to the red brightness value, the green brightness value, and the blue brightness value. The specific implementations of the foregoing step S320 to step S340 are further explained below from the description of the embodiments in FIG. 4 to FIG. 7.

Figure 4:
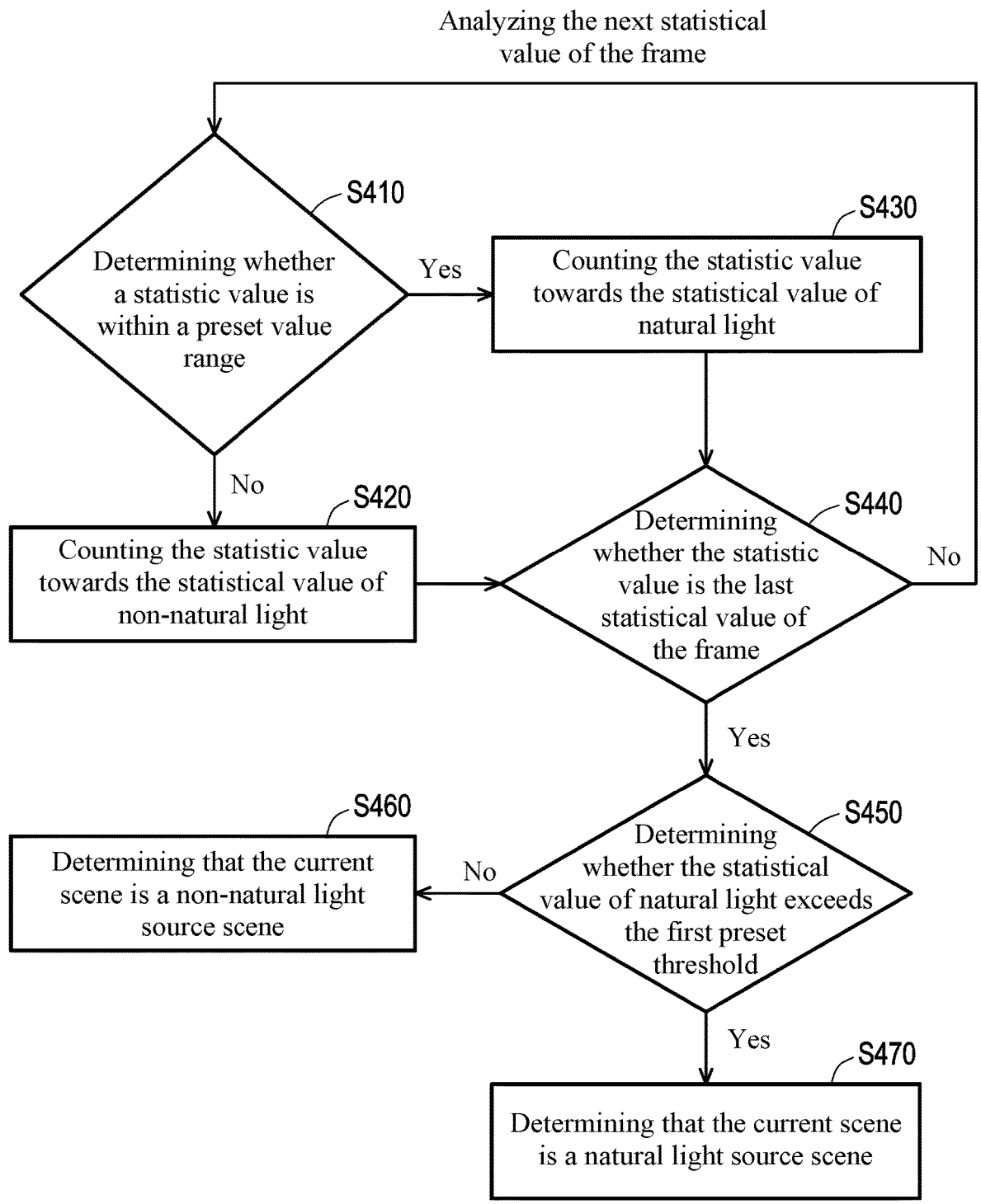
FIG. 4 is a flowchart of determining a light source state of a current scene of an embodiment of the disclosure.
Figure 5:
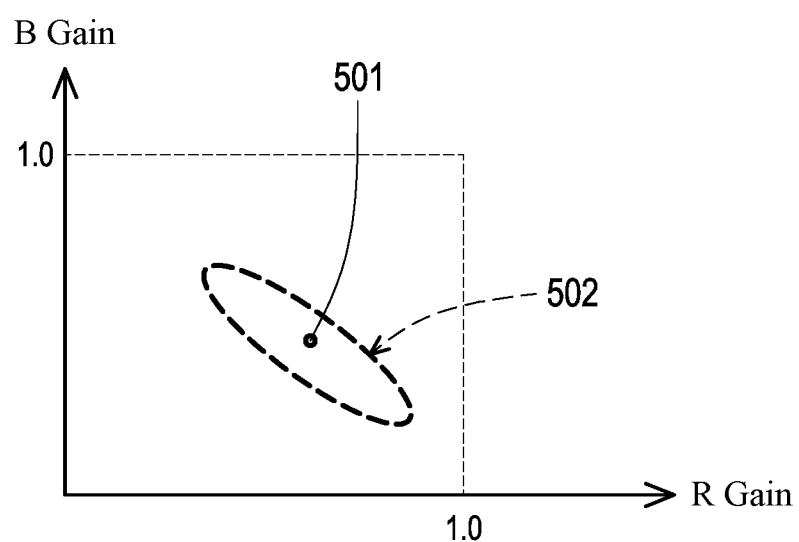
FIG. 5 is a schematic view of a preset value range of an embodiment of the disclosure.

FIG. 4 is a flowchart of determining a light source state of a current scene according to an embodiment of the disclosure. FIG. 5 is a schematic view of a preset value range of an embodiment of the disclosure. Referring to FIG. 1, FIG. 4, and FIG. 5, the process of this embodiment and the process of the following embodiment of FIG. 6 may be used to describe the specific implementation process of step S320 in FIG. 3. In this embodiment, the processor 110 may respectively determine whether the statistical values of the raw data are within a preset value range 502 as shown in FIG. 5, so as to count the statistical values of natural light. It is worth noting that the aforementioned statistical value may be a statistical value of the average value of each color in multiple divided regions in a frame. Each of the divided regions has an average of pixel values of the red sub-pixels, the green sub-pixels and the blue sub-pixels in all the pixels within its divided range. The preset value range is the red gain and the blue gain output by the image signal processor of the electronic device 100 according to the preset white balance algorithm. For example, as shown in FIG. 5, the coordinate point 501 in the coordinate system corresponding to the R (red) gain and the B (blue) gain, and the corresponding allowable range 502. In addition, in the aforementioned step S330, the green brightness information of the preview image refers to the green brightness information in the statistical value, which may be used by the processor 110 to determine and converge the exposure sensitivity required by the environment according to a preset automatic exposure algorithm.

In step S410, the processor 110 may determine whether a statistic value in a frame of the preview image is within a preset value range. For the determination in step S410, if no, then in step S420, the processor 110 may count the statistic value towards the statistical value of non-natural light. For the determination in step S410, if yes, then in step S430, the processor 110 may count the statistic value towards the statistical value of natural light. In step S440, the processor 110 may determine whether the statistic value is the last statistical value of the frame. For the determination in step S440, if no, then the processor 110 analyzes the next statistical value of the frame to perform step S410 again. For the determination in step S440, if yes, then in step S450, the processor 110 may determine whether the statistical value of natural light exceeds the first preset threshold. The first preset threshold may be an empirically set value, or may be designed according to different application devices, different application scenes, or different usage purposes.

For the determination in step S450, if no, then in step S460, the processor 110 determines that the current scene is a non-natural light source scene. For the determination in step S450, if yes, then in step S470, the processor 110 determines that the current scene is a natural light source scene. That is, the processor 110 of this embodiment may automatically determine whether the current scene is a natural light source scene or a non-natural light source scene according to the raw data of one frame of the preview image. In this regard, the natural light source scene or the non-natural light source scene respectively corresponds to different color temperatures (natural color temperature curve). In other words, the processor 110 of this embodiment may automatically determine whether the current scene belongs to the natural color temperature.

Figure 6:
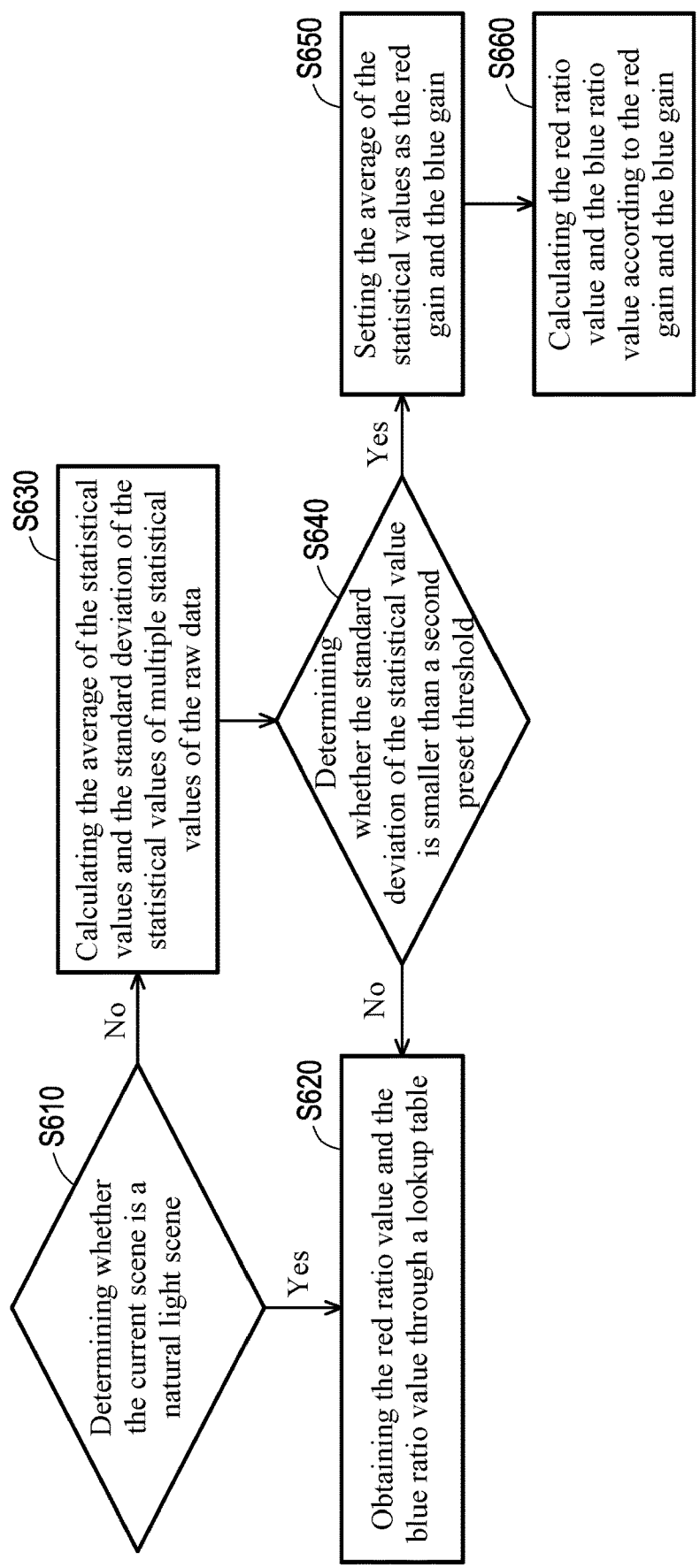
FIG. 6 is a flowchart of obtaining a red ratio value and a blue ratio value of an embodiment of the disclosure.

FIG. 6 is a flowchart of obtaining a red ratio value and a blue ratio value of an embodiment of the disclosure. Referring to FIG. 1 and FIG. 6, the process of this embodiment may continue to be executed following the determination in step S450 in the embodiment of FIG. 4 described above. In step S610, the processor 110 may determine whether the current scene is a natural light scene (i.e., the aforementioned determination in step S450). For the determination in step S610, if yes, then in step S620, the processor 110 may obtain the red ratio value and the blue ratio value through a lookup table. In this embodiment, the processor 110 may directly search a preset lookup table according to the color temperature parameter corresponding to the natural light source output by the image signal processor of the electronic device 100 to obtain the red ratio value and the blue ratio value. For the determination in step S610, if no, then in step S630, the processor 110 may calculate the average of the statistical values and the standard deviation of the statistical values of multiple statistical values of the raw data.

In step S640, the processor 110 may determine whether the standard deviation of the statistical value is smaller than a second preset threshold. The second preset threshold may be an empirically set value, or may be designed according to different application devices, different application scenes, or different usage purposes. For the determination in step S640, if no, then the processor 110 executes step S620. For the determination in step S640, if yes, then in step S650, the processor 110 may set the average of the statistical values as the red gain and the blue gain. Alternatively, in one embodiment, the processor 110 may re-average the statistical values within the standard deviation and then set it as the red gain and the blue gain. In step S660, the processor 110 may calculate the red ratio value and the blue ratio value according to the red gain and the blue gain. In this regard, the conversion formula between the aforementioned color gain value and the color ratio value may be designed according to the hardware configuration and the flash driver program, which is not limited by the disclosure. Therefore, the processor 110 of this embodiment may automatically obtain the red ratio value and the blue ratio value.

Figure 7:
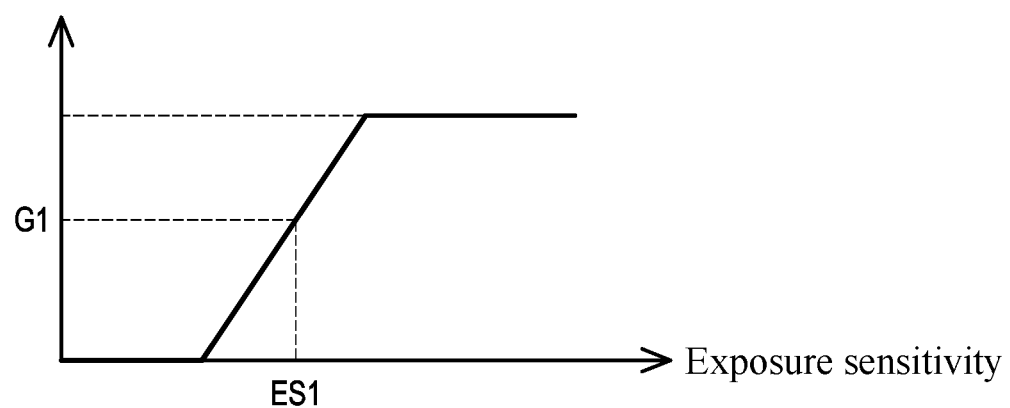
FIG. 7 is a schematic view of the relationship between the green brightness value and the exposure sensitivity of an embodiment of the disclosure.

FIG. 7 is a schematic view of the relationship between the green brightness value and the exposure sensitivity of an embodiment of the disclosure. Referring to FIG. 1, FIG. 3, and FIG. 7, in the step S340 above, the processor 110 may determine the green brightness value according to the relationship curve between the green brightness value and the exposure sensitivity shown in FIG. 7. In this regard, if the exposure sensitivity is lower, it means that the current scene is a high-brightness scene, so the green brightness value is lower. If the exposure sensitivity is higher, it means that the current scene is a low-brightness scene, so the green brightness value is higher. As shown in FIG. 7, the green brightness value and the exposure sensitivity may be in a proportional relationship within a range. In this embodiment, the image signal processor of the electronic device may determine and converge the exposure sensitivity required by the environment according to a preset automatic exposure algorithm. During the process of exposure convergence, the preset automatic exposure algorithm may search for a comparison table of exposure lines (or exposure tables) to find out the corresponding exposure gain and exposure time. Then, the processor 110 may multiply the exposure gain and the exposure time output by the image signal processor of the electronic device to obtain the exposure sensitivity ES1. Next, the processor 110 may determine the corresponding green brightness value G1 according to a lookup table or the relationship curve as shown in FIG. 7.

Finally, the processor 110 may multiply the green brightness value by the red ratio value to obtain the red brightness value, and multiply the green brightness value by the blue ratio value to obtain the blue brightness value. The processor 110 may obtain the red brightness value and the blue brightness value by, for example, calculating the following formula (1) and formula (2). In the following formula (1) and formula (2), the parameter R1 represents the red brightness value. The parameter G1 represents the green brightness value. The parameter B1 represents the blue brightness value. The parameter Rsc represents the red ratio value. The parameter Bsc represents the blue ratio value.

$$R1=G1 \times Rsc \quad \text{Formula (1)}$$

$$B1=G1 \times Bsc \quad \text{Formula (2)}$$

Therefore, when the user presses the shutter of the image sensor 120, the processor 110 may drive the flash 130 according to the red brightness value, the green brightness value, and the blue brightness values generated above, so that the red light source 131, the green light source 132, and the blue light source 133 of the flash 130 may simultaneously emit light of different colors according to the corresponding brightness value and the corresponding exposure intensity to synthesize an appropriate flash effect. In this way, the image sensor 120 may obtain photos with correct color development and exposure.

To sum up, the electronic device with a flash function and the driving method of a flash of the disclosure may analyze the raw data of the preview image to automatically determine the light source of the current scene, and generate the red brightness value, the green brightness value, and the blue brightness value for driving the flash according to the corresponding color temperature information, exposure information, and brightness information. Therefore, when the image sensor of the electronic device obtains a photo of the target, the target may be illuminated by the appropriate flash effect simultaneously emitted by the flash, so that the photographing result of the image sensor may have a good imaging effect.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. An electronic device with a flash function, comprising:
a flash, having a red light source, a green light source, and a blue light source;
an image sensor, configured to obtain a preview image of a current scene and outputting raw data of the preview image; and
a processor, coupled to the flash and the image sensor, wherein the processor obtains a red ratio value and a blue ratio value according to the current scene, the processor determines exposure sensitivity according to green brightness information of the preview image, and the processor determines a green brightness value according to the exposure sensitivity, wherein the processor calculates a red brightness value and a blue brightness value according to the green brightness value, the red ratio value, and the blue ratio value, and the processor drives the flash according to the red brightness value, the green brightness value, and the blue brightness value.

2. The electronic device according to claim 1, wherein the processor determines whether the current scene is a natural light source scene or a non-natural light source scene according to the raw data, wherein the processor obtains the red ratio value and the blue ratio value through a lookup table when the current scene is the natural light source scene, wherein the processor calculates the red ratio value and the blue ratio value when the current scene is the non-natural light source scene.

3. The electronic device according to claim 2, wherein the processor respectively determines whether each statistical value of the raw data are within a preset value range to count a statistical value of natural light, and the processor determines whether a sum of number of the statistical value of the natural light exceeds a first preset threshold to determine whether the current scene is the natural light source scene or the non-natural light source scene.

4. The electronic device according to claim 3, wherein the preset value range is an allowable range corresponding to a first red gain and a first blue gain output by an image signal processor of the electronic device.

5. The electronic device according to claim 2, wherein when the current scene is the natural light source scene, the processor searches the lookup table according to a color temperature parameter output by the image signal processor of the electronic device to obtain the red ratio value and the blue ratio value.

6. The electronic device according to claim 2, wherein when the current scene is the non-natural light source scene, the processor calculates an average of the statistical values and a standard deviation of the statistical values of a plurality of statistical values of the raw data, and the processor determines whether the standard deviation of the statistical values is smaller than a second preset threshold to obtain the red ratio value and the blue ratio value.

7. The electronic device according to claim 6, wherein when the standard deviation of the statistical values is smaller than the second preset threshold, the processor sets the average of the statistical values as a second red gain and a second blue gain, and calculates the red ratio value and the blue ratio value according to the second red gain and the second blue gain, wherein the processor obtains the red ratio value and the blue ratio value through the lookup table when the statistical value is greater than or equal to the second preset threshold.

8. The electronic device according to claim 1, wherein the processor multiplies an exposure gain and an exposure time output by an image signal processor of the electronic device to obtain the exposure sensitivity.

9. The electronic device according to claim 1, wherein the green brightness value is proportional to the exposure sensitivity.

10. The electronic device according to claim 1, wherein the processor multiplies the green brightness value by the red ratio value to obtain the red brightness value, and the processor multiplies the green brightness value by the blue ratio value to obtain the blue brightness value.

11. A driving method of a flash, comprising:
obtaining a preview image of a current scene through an image sensor, and outputting raw data of the preview image;
obtaining a red ratio value and a blue ratio value according to the current scene;
obtaining exposure sensitivity according to green brightness information of the preview image;
determining a green brightness value according to the exposure sensitivity;
calculating a red brightness value and a blue brightness value according to the green brightness value, the red ratio value, and the blue ratio value; and
driving the flash according to the red brightness value, the green brightness value, and the blue brightness value.

12. The driving method according to claim 11, wherein obtaining the red ratio value and the blue ratio value according to the current scene comprises:
determining whether the current scene is a natural light source scene or a non-natural light source scene according to the raw data;
obtaining the red ratio value and the blue ratio value through a lookup table when the current scene is the natural light source scene; and
calculating the red ratio value and the blue ratio value when the current scene is the non-natural light source scene.

13. The driving method according to claim 12, wherein determining whether the current scene is the natural light source scene or the non-natural light source scene comprises:
respectively determining whether a plurality of statistical values of the raw data are within a preset value range to count a statistical value of natural light; and
determining whether the statistical value of the natural light exceeds a first preset threshold to determine whether the current scene is the natural light source scene or the non-natural light source scene.

14. The driving method according to claim 13, wherein the preset value range is an allowable range corresponding to a first red gain and a first blue gain output by an image signal processor of an electronic device.

15. The driving method according to claim 12, wherein when the current scene is the natural light source scene, obtaining the red ratio value and the blue ratio value through the lookup table comprises:
searching the lookup table according to a color temperature parameter output by the image signal processor of an electronic device to obtain the red ratio value and the blue ratio value.

16. The driving method according to claim 12, wherein when the current scene is the non-natural light source scene, calculating the red ratio value and the blue ratio value comprises:
calculating an average of the statistical values and a standard deviation of the statistical values of a plurality of statistical values of the raw data; and
determining whether the standard deviation of the statistical values is smaller than a second preset threshold to obtain the red ratio value and the blue ratio value.

17. The driving method according to claim 16, wherein determining whether the standard deviation of the statistical values is smaller than the second preset threshold to obtain the red ratio value and the blue ratio value comprises:

setting the average of the statistical values as a second red gain and a second blue gain;

calculating the red ratio value and the blue ratio value according to the second red gain and the second blue gain; and obtaining the red ratio value and the blue ratio value through the lookup table when the statistical value is greater than or equal to the second preset threshold.

18. The driving method according to claim 11, further comprising:

multiplying an exposure gain and an exposure time output by an image signal processor of an electronic device to obtain the exposure sensitivity.

19. The driving method according to claim 11, wherein the green brightness value is proportional to the exposure sensitivity.

20. The driving method according to claim 11, wherein calculating the red brightness value and the blue brightness value comprises:

multiplying the green brightness value by the red ratio value to obtain the red brightness value; and multiplying the green brightness value by the blue ratio value to obtain the blue brightness value.

* * * * *